US011326670B2

(12) United States Patent
Cobb et al.

(10) Patent No.: US 11,326,670 B2
(45) Date of Patent: May 10, 2022

(54) TENSIONER WITH PISTON CONTAINING AN INTERNAL CHECK VALVE

(71) Applicant: BorgWarner Inc., Auburn Hills, MI (US)

(72) Inventors: Keith B. Cobb, Cortland, NY (US); Paul Freemantle, Lansing, NY (US); Robert G Williamson, Breesport, NY (US); Adam C Hunt, Brooktondale, NY (US); Seongdo Hong, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 190 days.

(21) Appl. No.: 16/715,195

(22) Filed: Dec. 16, 2019

(65) Prior Publication Data

US 2020/0200239 A1    Jun. 25, 2020

Related U.S. Application Data

(60) Provisional application No. 62/784,257, filed on Dec. 21, 2018.

(51) Int. Cl.
 *F16H 7/08* (2006.01)
(52) U.S. Cl.
 CPC ....... *F16H 7/08* (2013.01); *F16H 2007/0806* (2013.01); *F16H 2007/0812* (2013.01);
 (Continued)
(58) Field of Classification Search
 CPC ............... F16H 7/08; F16H 2007/0802; F16H 2007/0806; F16H 2007/0812;
 (Continued)

(56) References Cited

U.S. PATENT DOCUMENTS

| 976,010 A | 11/1910 | Thompson |
| 979,811 A | 12/1910 | Wallem |
| (Continued) | | |

FOREIGN PATENT DOCUMENTS

| DE | 102009049245 A1 | 5/2010 |
| EP | 0645289 A2 | 3/1995 |
| (Continued) | | |

OTHER PUBLICATIONS

International Search Report for PCT/2016/030908 dated Aug. 16, 2016.

(Continued)

*Primary Examiner* — Michael R Mansen
*Assistant Examiner* — Raveen J Dias
(74) *Attorney, Agent, or Firm* — Brown & Michaels, PC

(57) ABSTRACT

A hydraulic tensioner for an internal combustion engine for tensioning a span of a chain or a belt has a piston with an internal reservoir connected to a high pressure chamber through a check valve assembly. The check valve assembly has a disk seat formed by an internal bulge within the piston; a check valve retainer within the piston, and a moveable disk that is received between the disk seat formed by the internal bulge and the check valve retainer and is moveable between a first position and a second position, and a check valve spring that is received between the check valve disk and the check valve retainer.

13 Claims, 4 Drawing Sheets

(52) U.S. Cl.
CPC ............... *F16H 2007/0859* (2013.01); *F16H 2007/0891* (2013.01); *F16H 2007/0895* (2013.01); *F16H 2007/0897* (2013.01)

(58) Field of Classification Search
CPC ........... F16H 2007/0814; F16H 7/0848; F16H 2007/0859; F16H 2007/0891; F16H 2007/0895; F16H 2007/0897; F16H 7/0836; F16H 7/1236
See application file for complete search history.

(56) References Cited

U.S. PATENT DOCUMENTS

| | | | |
|---|---|---|---|
| 1,613,145 A | 1/1927 | Trump | |
| 1,682,602 A | 8/1928 | Dawley | |
| 1,915,694 A | 6/1933 | Reindel | |
| 2,167,721 A | 8/1939 | La Brie | |
| 2,273,737 A | 2/1942 | Snyder | |
| 2,308,876 A | 1/1943 | Hammett | |
| 2,767,733 A | 10/1956 | Anderson | |
| 2,853,159 A | 9/1958 | Kuhn | |
| 2,908,109 A | 10/1959 | Irving | |
| 2,960,109 A | 11/1960 | Wilson | |
| 3,169,548 A | 2/1965 | Mcintosh | |
| 3,269,409 A | 8/1966 | William | |
| 3,304,952 A | 2/1967 | Krone | |
| 3,415,272 A | 12/1968 | Blackhawk et al. | |
| 3,437,065 A | 4/1969 | Robbins, Jr. | |
| 3,536,094 A | 10/1970 | Manley, Jr. | |
| 3,719,401 A | 3/1973 | Peruglia | |
| 3,913,322 A | 10/1975 | Over et al. | |
| 4,018,247 A | 4/1977 | Carr | |
| 4,237,935 A | 12/1980 | Delmonte et al. | |
| 4,253,524 A | 3/1981 | Erickson | |
| 4,278,106 A | 7/1981 | Cunningham | |
| 4,507,103 A | 3/1985 | Mittermeier | |
| 4,526,195 A | 7/1985 | Humphrey et al. | |
| 4,628,957 A | 12/1986 | Hofer et al. | |
| 4,648,369 A | 3/1987 | Wannenwetsch | |
| 4,772,251 A * | 9/1988 | Goppelt ................ | F16H 7/08 474/101 |
| 4,792,322 A | 12/1988 | Goppelt et al. | |
| 4,940,447 A | 7/1990 | Kawashima et al. | |
| 5,183,075 A | 2/1993 | Stein | |
| 5,271,429 A | 12/1993 | Bauer et al. | |
| 5,346,436 A | 9/1994 | Hunter et al. | |
| 5,406,976 A | 4/1995 | Bekki | |
| 5,449,018 A | 9/1995 | Harris | |
| 5,469,883 A | 11/1995 | Lee | |
| 5,511,583 A | 4/1996 | Bassett | |
| 5,637,047 A | 6/1997 | Schulze | |
| 5,655,567 A | 8/1997 | Mikel | |
| 5,700,213 A | 12/1997 | Simpson et al. | |
| 5,707,309 A | 1/1998 | Simpson | |
| 5,797,817 A * | 8/1998 | Senftleben ................ | F01L 1/02 474/110 |
| 5,819,794 A | 10/1998 | Anderson | |
| 5,879,256 A | 3/1999 | Tada | |
| 5,913,742 A | 6/1999 | Nakamura et al. | |
| 5,924,438 A | 7/1999 | Cimminelli et al. | |
| 5,967,920 A | 10/1999 | Dembosky et al. | |
| 5,993,341 A | 11/1999 | Anderson | |
| 6,142,168 A | 11/2000 | Sumrall | |
| 6,193,623 B1 * | 2/2001 | Koch ................ | F16H 7/0848 474/110 |
| 6,298,873 B1 | 10/2001 | LeVey et al. | |
| 6,322,468 B1 | 11/2001 | Wing et al. | |
| 6,361,458 B1 | 3/2002 | Smith | |
| 6,383,103 B1 | 5/2002 | Fujimoto et al. | |
| 6,435,993 B1 * | 8/2002 | Tada ................ | F16H 7/0836 474/109 |
| 6,510,868 B2 | 1/2003 | Penza | |
| 6,537,043 B1 | 3/2003 | Chen | |
| 6,575,192 B1 | 6/2003 | Shaffer | |
| 6,581,632 B2 | 6/2003 | Walpole et al. | |
| 6,592,479 B2 | 7/2003 | Nakakubo et al. | |
| 6,716,124 B2 | 4/2004 | Markley | |
| 6,811,505 B2 | 11/2004 | Hashimoto et al. | |
| 7,028,708 B1 * | 4/2006 | Langenfeld ........... | F16K 15/025 137/493.6 |
| 7,108,621 B2 | 9/2006 | Ullein et al. | |
| 7,174,799 B2 | 2/2007 | Yoshida et al. | |
| 7,258,134 B1 | 8/2007 | Langenfeld et al. | |
| 7,367,353 B1 | 5/2008 | Langenfeld et al. | |
| 7,404,776 B2 | 7/2008 | Yoshida | |
| 7,427,249 B2 | 9/2008 | Yoshida | |
| 7,568,497 B1 | 8/2009 | Langenfeld et al. | |
| 7,618,339 B2 | 11/2009 | Hashimoto et al. | |
| 7,775,921 B2 | 8/2010 | Izutsu et al. | |
| 7,775,924 B2 | 8/2010 | Koch | |
| 7,913,715 B2 | 3/2011 | Martin | |
| 8,002,656 B2 | 8/2011 | Emizu et al. | |
| 8,137,224 B2 | 3/2012 | Emizu et al. | |
| 8,403,783 B2 | 3/2013 | Wigsten | |
| 8,574,106 B2 | 11/2013 | Botez | |
| 8,585,519 B2 | 11/2013 | Hartmann | |
| 8,951,154 B2 | 2/2015 | Konuma et al. | |
| 9,309,878 B2 | 4/2016 | Columpsi | |
| 9,765,770 B2 | 9/2017 | Babbini et al. | |
| 10,006,524 B2 | 6/2018 | Crump et al. | |
| 10,107,367 B2 | 10/2018 | Kunimatsu et al. | |
| 10,260,603 B2 | 4/2019 | Kurematsu | |
| 2001/0032675 A1 | 10/2001 | Russell | |
| 2002/0022541 A1 | 2/2002 | Ullein et al. | |
| 2002/0098932 A1 | 7/2002 | Hashimoto et al. | |
| 2003/0008738 A1 | 1/2003 | Rossato et al. | |
| 2003/0125143 A1 | 7/2003 | Seungpyo | |
| 2004/0154666 A1 | 8/2004 | Gessat et al. | |
| 2004/0194828 A1 | 10/2004 | Landhuis | |
| 2004/0214671 A1 | 10/2004 | Clayton | |
| 2004/0266572 A1 | 12/2004 | Yoshida et al. | |
| 2005/0064969 A1 | 3/2005 | Tomita et al. | |
| 2005/0227799 A1 | 10/2005 | Yoshida | |
| 2005/0265856 A1 | 12/2005 | Yoshida | |
| 2006/0063625 A1 | 3/2006 | Emizu et al. | |
| 2006/0094549 A1 | 5/2006 | Yoshida et al. | |
| 2007/0044846 A1 | 3/2007 | Ashurst et al. | |
| 2007/0270259 A1 * | 11/2007 | Koch ................... | F16H 7/0848 474/110 |
| 2008/0261737 A1 | 10/2008 | Yoshida et al. | |
| 2008/0280712 A1 * | 11/2008 | Ryouno ................ | F16H 7/0848 474/110 |
| 2008/0289703 A1 | 11/2008 | Penzone et al. | |
| 2008/0293526 A1 | 11/2008 | Wigsten | |
| 2009/0111628 A1 | 4/2009 | Poiret et al. | |
| 2009/0197721 A1 | 8/2009 | Emizu et al. | |
| 2010/0004080 A1 | 1/2010 | He | |
| 2010/0090149 A1 | 4/2010 | Thompson et al. | |
| 2011/0015013 A1 * | 1/2011 | Hofmann ............. | F16H 7/0848 474/110 |
| 2011/0237370 A1 | 9/2011 | Hartmann | |
| 2011/0263366 A1 | 10/2011 | Botez | |
| 2011/0278775 A1 | 11/2011 | Germano et al. | |
| 2012/0329590 A1 | 12/2012 | Yoshii et al. | |
| 2013/0017913 A1 | 1/2013 | Hartmann | |
| 2013/0313057 A1 | 11/2013 | Tsukahara et al. | |
| 2014/0100068 A1 * | 4/2014 | Kurematsu ........... | F16H 7/0836 474/110 |
| 2014/0200104 A1 * | 7/2014 | Kurematsu ............ | F16H 7/08 474/110 |
| 2014/0256486 A1 | 9/2014 | Lunk et al. | |
| 2015/0252878 A1 | 9/2015 | Kitano et al. | |
| 2015/0267789 A1 * | 9/2015 | Kurematsu ............ | F16H 7/0848 474/110 |
| 2015/0292602 A1 * | 10/2015 | Kurematsu ........... | F16H 7/0848 474/110 |
| 2015/0354674 A1 | 12/2015 | Markley et al. | |
| 2016/0123435 A1 * | 5/2016 | Yoshida ................. | F16H 7/08 474/110 |
| 2016/0153530 A1 * | 6/2016 | Kitamura ............... | F16H 7/08 474/110 |

(56) References Cited

U.S. PATENT DOCUMENTS

| | | | |
|---|---|---|---|
| 2016/0186838 A1* | 6/2016 | Kurematsu | F16H 7/08 474/110 |
| 2016/0290447 A1 | 10/2016 | Kunimatsu et al. | |
| 2016/0327135 A1* | 11/2016 | Fischer | F16H 7/0836 |
| 2016/0348765 A1* | 12/2016 | Ishikawa | F16H 7/0836 |
| 2016/0356365 A1 | 12/2016 | Crump et al. | |
| 2017/0023140 A1* | 1/2017 | Crump | F16K 15/025 |
| 2017/0130807 A1* | 5/2017 | Kurematsu | F16H 7/0848 |
| 2017/0138443 A1 | 5/2017 | Kurematsu et al. | |
| 2017/0227135 A1* | 8/2017 | Crump | F16H 7/0848 |
| 2017/0356528 A1* | 12/2017 | Fischer | F16H 7/08 |
| 2017/0356529 A1* | 12/2017 | Simmons | F16H 7/0848 |
| 2017/0370447 A1* | 12/2017 | Freemantle | F16H 7/0848 |
| 2018/0087628 A1* | 3/2018 | Maeda | F16H 7/0836 |
| 2018/0128354 A1 | 5/2018 | Watanabe | |
| 2018/0274638 A1 | 9/2018 | Watanabe et al. | |
| 2018/0363740 A1* | 12/2018 | Kimura | F16K 15/028 |
| 2019/0003557 A1* | 1/2019 | Cobb | A47G 23/03 |
| 2019/0011022 A1* | 1/2019 | Miyazawa | F16K 15/046 |
| 2019/0063562 A1* | 2/2019 | Watanabe | F16H 7/0831 |
| 2019/0107178 A1* | 4/2019 | Yoshida | F16H 7/0848 |
| 2019/0113113 A1* | 4/2019 | Benn | F16H 7/0848 |
| 2019/0113114 A1* | 4/2019 | Benn | F16K 15/025 |
| 2019/0128389 A1* | 5/2019 | Ullein | F16H 7/0834 |
| 2019/0170224 A1* | 6/2019 | Fuhrmann | F16H 7/08 |
| 2019/0195123 A1* | 6/2019 | Iwasaki | F16H 7/0829 |
| 2019/0257390 A1* | 8/2019 | Watanabe | F16H 7/0848 |
| 2019/0277370 A1* | 9/2019 | Iwasaki | F16H 7/08 |
| 2019/0316657 A1 | 10/2019 | Cobb et al. | |
| 2019/0360559 A1 | 11/2019 | Sato | |
| 2020/0018383 A1* | 1/2020 | Lu | F15B 13/027 |
| 2020/0271199 A1* | 8/2020 | Hunt | F16H 7/0848 |
| 2020/0393023 A1* | 12/2020 | Ishikawa | F16K 17/04 |
| 2021/0123509 A1* | 4/2021 | Kimura | F16H 7/08 |

FOREIGN PATENT DOCUMENTS

| | | |
|---|---|---|
| EP | 0919744 A1 | 6/1999 |
| GB | 2410332 A | 7/2005 |
| JP | H09119490 A | 5/1997 |
| JP | H09203440 A | 8/1997 |
| JP | H09203441 A | 8/1997 |
| JP | 10306857 | 11/1998 |
| JP | H10306857 A | 11/1998 |
| JP | 2002257251 A | 9/2002 |
| JP | 2003314719 A | 11/2003 |
| JP | 2005344738 A | 12/2005 |
| JP | 2006144877 A | 6/2006 |
| JP | 2006322521 A | 11/2006 |
| JP | 2007010129 A | 1/2007 |
| JP | 2011012732 A | 1/2011 |
| JP | 2014077465 A | 5/2014 |
| JP | 2015183767 A | 10/2015 |
| JP | 2016121721 A | 7/2016 |
| KR | 20100091316 A | 8/2010 |
| KR | 20150096686 A | 8/2015 |
| KR | 20150141183 A | 12/2015 |
| WO | 2008027067 A1 | 3/2008 |
| WO | 2012118723 A2 | 9/2012 |
| WO | 2012106093 A3 | 10/2012 |
| WO | 2014061593 A1 | 4/2014 |
| WO | 2015048560 A9 | 5/2015 |
| WO | 2015084592 A1 | 6/2015 |
| WO | 2015110104 A1 | 7/2015 |
| WO | 2015116606 A1 | 8/2015 |

OTHER PUBLICATIONS

International Search Report for PCT/US2014/066496 dated Mar. 16, 2015.

International Search Report for PCT/US2016/038306 dated Aug. 24, 2016.

International Search Report for PCT/US2016/041974 dated Sep. 12, 2016.

International Search Report for PCT/US2016/043831 dated Nov. 2016.

International Search Report for PCT/US2017/047101 dated Nov. 27, 2017.

International Search Report for PCT/US2018/019640 dated Nov. 26, 2018.

* cited by examiner

TENSIONER WITH PISTON CONTAINING AN INTERNAL CHECK VALVE

REFERENCE TO RELATED APPLICATIONS

This application claims one or more inventions which were disclosed in Provisional Application No. 62/784,257 filed Dec. 21, 2018, entitled "TENSIONER WITH PISTON CONTAINING AN INTERNAL CHECK VALVE". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of hydraulic tensioners. More particularly, the invention pertains to a hydraulic tensioner with a piston containing an internal check valve.

Description of Related Art

In conventional hydraulic tensioners, check valves are placed on the bottom of an open-ended bore of the tensioner housing, which receives a plunger, close to an inlet supply and in a high pressure chamber formed between the plunger of the tensioner and a bore of the tensioner housing.

SUMMARY OF THE INVENTION

A hydraulic tensioner for an internal combustion engine for tensioning a span of a chain or a belt has a piston with an internal reservoir connected to a high pressure chamber through a check valve assembly. The check valve assembly has: a disk seat formed by an internal bulge within the piston; a check valve retainer within the piston, and a moveable disk received between the disk seat formed by the internal bulge and the check valve retainer and moveable between a first position and a second position, and a check valve spring received between the moveable disk and the check valve retainer.

In a first disk position, the moveable disk is biased against the disk seat by the check valve spring, preventing fluid from passing from the internal reservoir to the hydraulic high pressure chamber within the piston. In a second disk position, the moveable disk is biased against the check valve spring, such that fluid can flow from the internal reservoir to the high pressure chamber adjacent to the disk seat and within the piston. When the disk is fully open in the second position, the disk is biased against the retainer by the force of the oil flowing between the disk seat and the internal bulge.

When dynamic load from the chain or belt moves the piston inwards and outwards from the housing, fluid from the internal reservoir is drawn into the high pressure chamber between the internal bulge and the moveable disk of the check valve assembly, increasing the fluid pressure within the high pressure chamber, exerting an outward force on the piston, opposing an inward force of the dynamic load from the chain or belt.

Unlike conventional tensioners, the check valve assembly of the present invention is placed within a transition diameter of the bore of the piston. The transition diameter is formed by the internal bulge or a pinched portion of the piston. The transition diameter is between a first diameter which has an internal reservoir and a second diameter which has a high pressure chamber and a tensioner spring. By placing the check valve assembly within the transition diameter between the internal reservoir and the high pressure chamber, the response time of the piston reaction force is improved, as the oil reservoir is moved closer to the high pressure chamber as compared to a conventional ball inlet check valve that is placed in the outlet of an external reservoir.

DETAILED DESCRIPTION OF THE INVENTION

Figure 1:
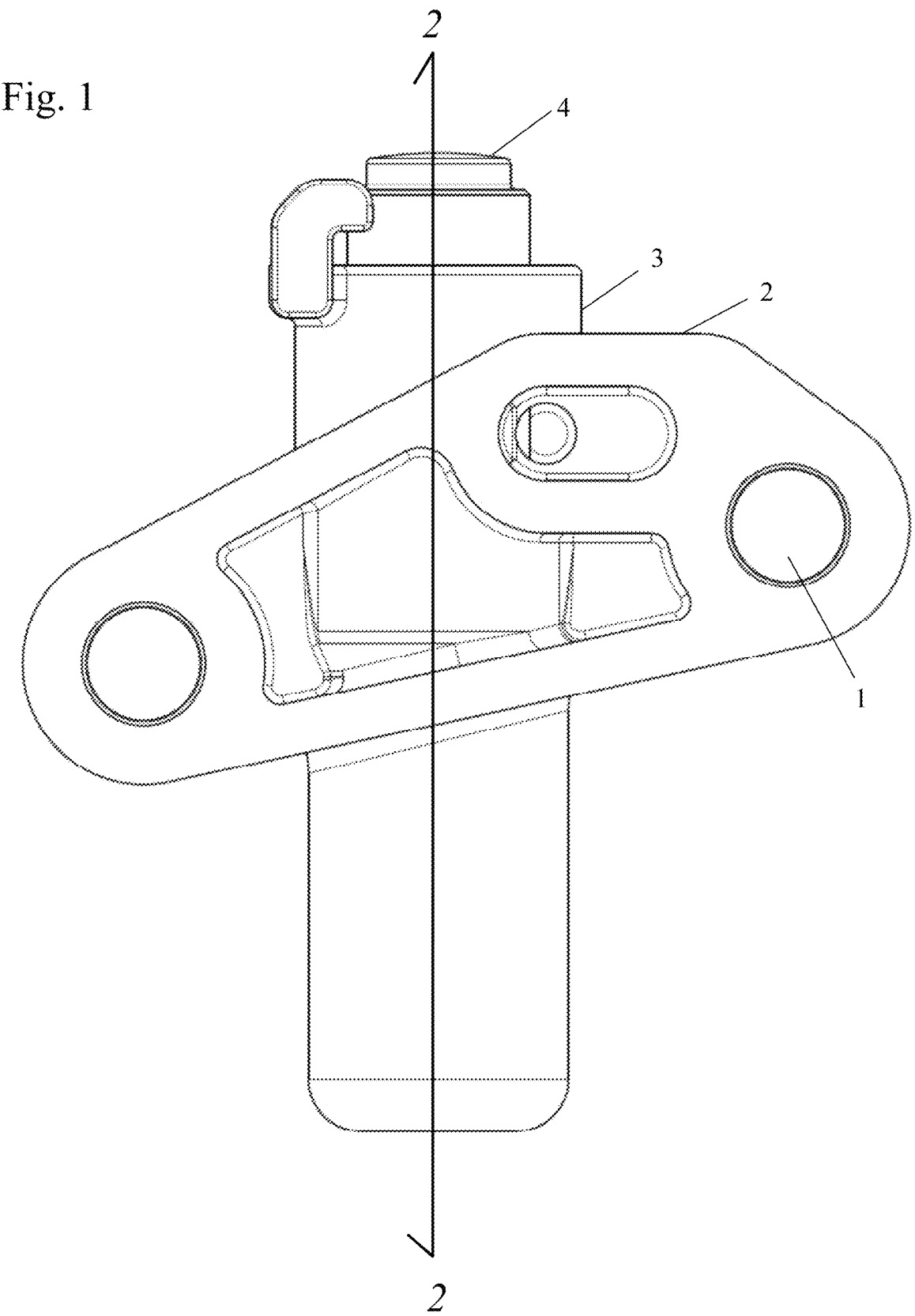
FIG. 1 shows an exterior view of a hydraulic tensioner of an embodiment.
Figure 2:
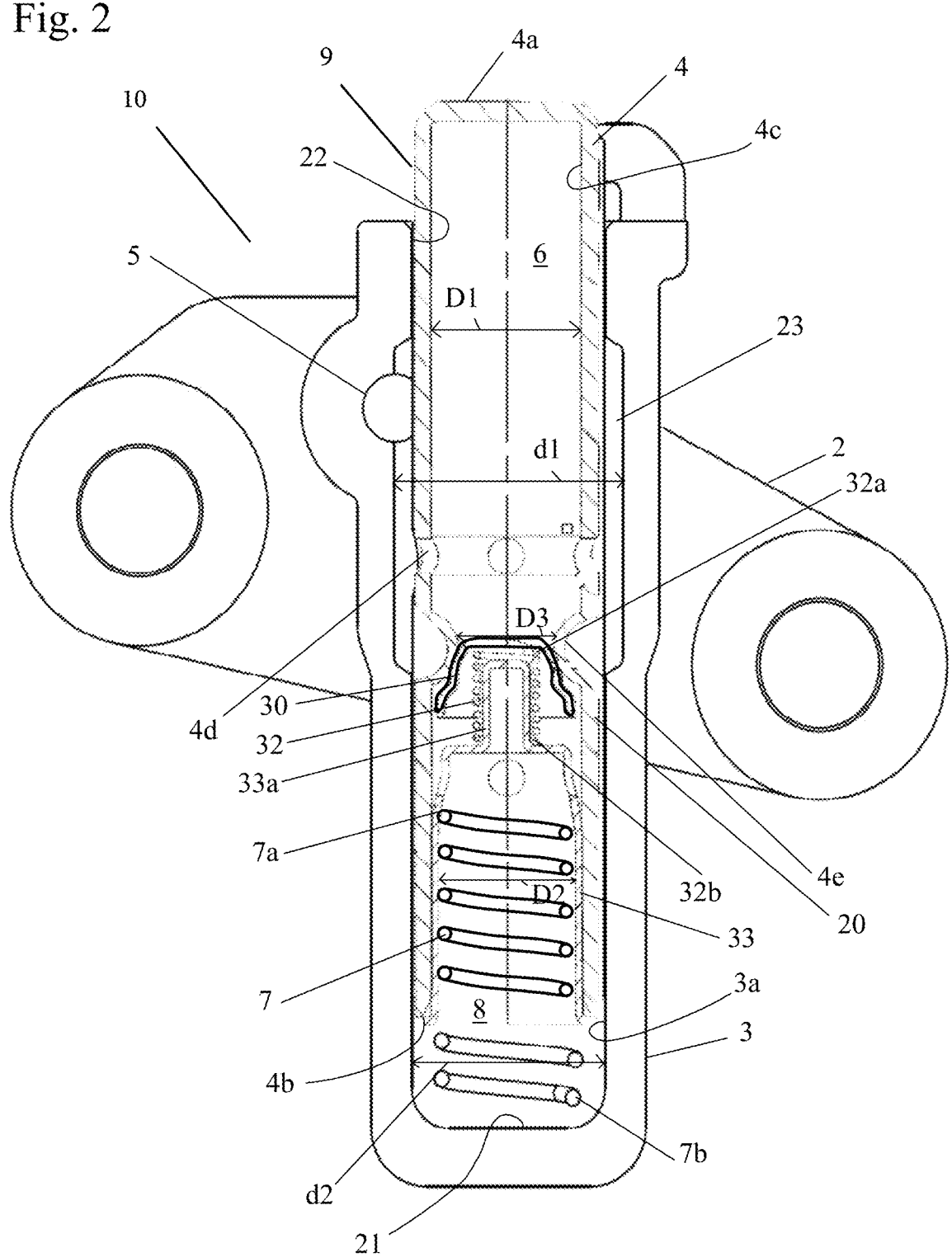
FIG. 2 shows a sectional view of the hydraulic tensioner of FIG. 1 along line 2-2 with the check valve in a closed position.
Figure 3:
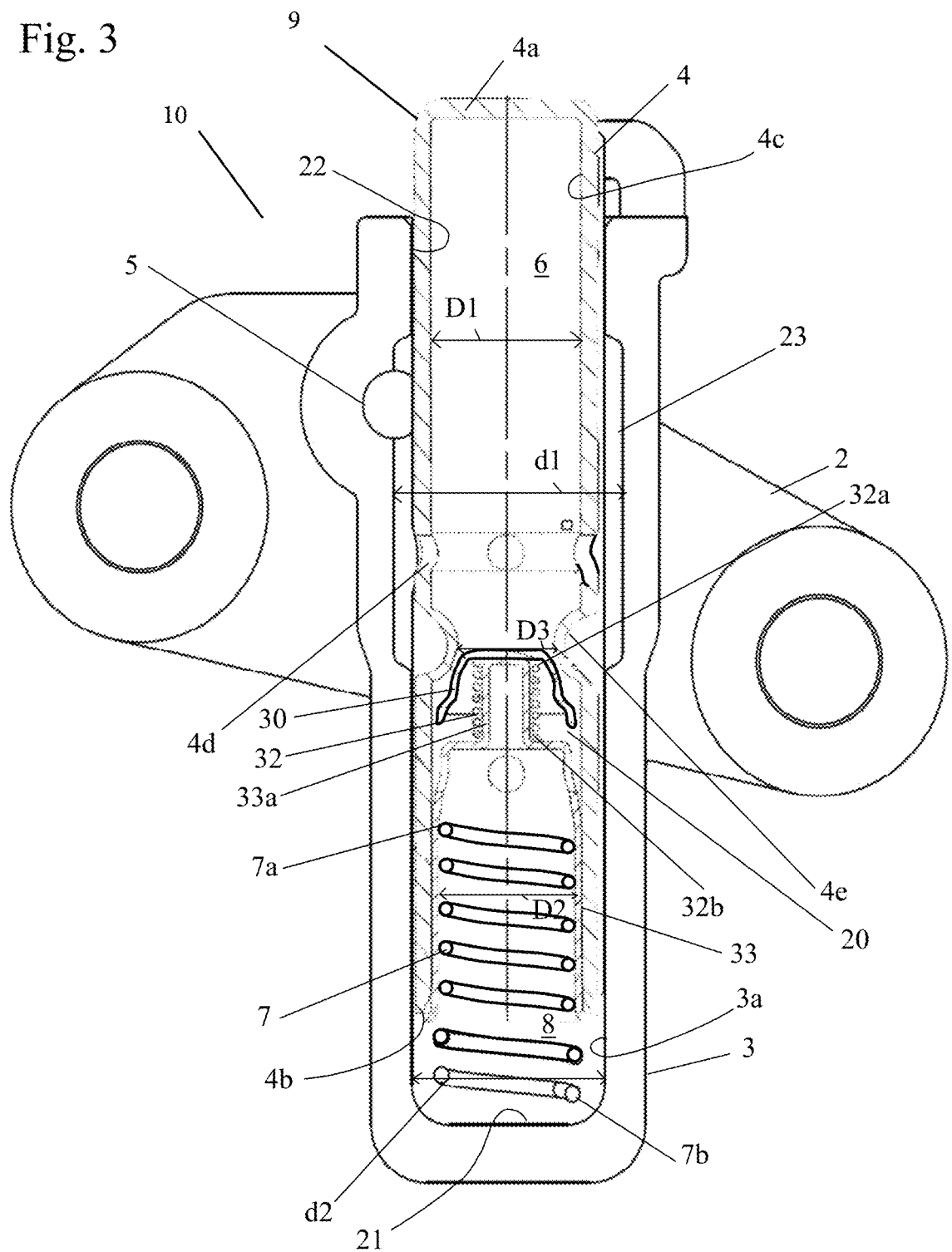
FIG. 3 shows a sectional view of the hydraulic tensioner of FIG. 1 along 2-2 with the check valve in an open position.

The hydraulic tensioner 10 of FIGS. 1-3 can be used for an endless loop flexible power transmission member for an internal combustion engine of a motor vehicle, such as a chain or belt. The power transmission member can encircle a drive sprocket driven by a drive shaft, such as a crankshaft of the engine, and the at least one driven sprocket can be supported by a driven shaft, such as a camshaft of the engine.

Referring to FIGS. 1-3, the hydraulic tensioner 10 can, in some embodiments, be mounted to an engine block of an internal combustion engine (not shown) via a mounting plate 2. The mounting plate 2 can be secured to the engine block (not shown) via bolts or screws received in mounting plate holes 1. The mounting plate 2 can be coupled to or formed in part with a tensioner housing 3. The tensioner housing 3 can have a closed end multi-staged internal bore 3*a*. Between a closed end 21 of the bore 3*a* and an open end 22 of the bore 3*a*, there is an inlet portion 23 of the bore 3*a* having a diameter d1, which is greater than the diameter d2 of the bore 3*a* at the closed end 21 and the open end 22 of the bore 3*a*. An oil inlet 5 can be present in the inlet portion 23 of the bore 3*a* and can be in fluid communication with a fluid supply (not shown).

A hollow piston 4 can be slidably received within the bore 3*a* of the housing 3. The hollow piston 4 has a body 9 with a first end 4*a*, a second end 4*b*. The first end 4*a* of the hollow piston 4 can be in contact with a tensioner body, guide or endless loop flexible power transmission member for an internal combustion engine. The second end 4*b* of the hollow piston 4 can be received within the bore 3*a* of the tensioner housing 3.

The hollow piston 4 can have an internal bore 4*c*. The internal bore 4*c* can have a first diameter D1, a second diameter D2, and a transition diameter D3 between the first diameter D1 and the second diameter D2. The first diameter D1 is preferably smaller than the second diameter D2. The transition diameter D3 is smaller than the first and second diameter D1, D2. An inlet 4*d* is present on the body of the piston 4, the inlet being in communication with the oil inlet 5. In an alternate embodiment, the first diameter and the second diameter are approximately the same.

A check valve assembly 20 is received within the transition diameter D3 of the internal bore 4*c* of the piston 4, dividing the internal bore 4*c* into an internal reservoir 6 and a high pressure chamber 8. The internal reservoir 6 is formed between the first diameter D1 of the internal bore 4c and the check valve assembly 20. The high pressure chamber 8 is formed between the check valve assembly 20, the second diameter D2 of the internal bore 4c of the piston 4, the second end 4b of the piston 4, and the closed end 21 of the bore 3a of the housing 3. A tensioner spring 7 is also preferably present within the high pressure chamber 8, with a first end 7a of the tensioner spring 7 biased against a retainer 33 of the check valve assembly 20 and the second end 7b of the tensioner spring 7 biased against the closed end 21 of the bore 3a of the housing 3, biasing the check valve assembly 20, and thus the piston 4 outwards and away from the closed end 21 of the bore 3a of the tensioner housing 3.

Within the internal bore 4c of the hollow piston 4, a check valve assembly 20 is received within the transition diameter D3 and the second diameter D2 of the piston 4. The transition diameter D3 is formed in one embodiment by externally rolling a portion of the piston body 9 to form an internal bulge or pinched portion 4e. After formation of the internal bulge 4e through rolling, the surface of the internal bulge 4e may be coined. In an alternate embodiments, the internal bulge 4e is formed by the forming tool itself.

The check valve assembly 20 has a movable disk 30 which seats on the internal bulge 4e of the piston 4. The moveable disk 30 is biased into seating or sealing against the internal bulge 4e of the piston 4 by a check valve spring 32. The check valve spring 32 has a first end 32a in contact with a retainer 33 received within the high pressure chamber 8 and contains a protrusion 33a which the check valve spring surrounds. The second end 32b of the check valve spring 32 contacts the moveable disk 30. The shape of the retainer 33 is not limited to the shape shown in the drawings. The length or height of the protrusion 33a may be altered. The length or height of the protrusion 33a may be altered to allow increased travel of the moveable disk 30 relative to the internal bulge 4e and increase the flow from the inlet 5 to the high pressure chamber 8.

Figure 4:
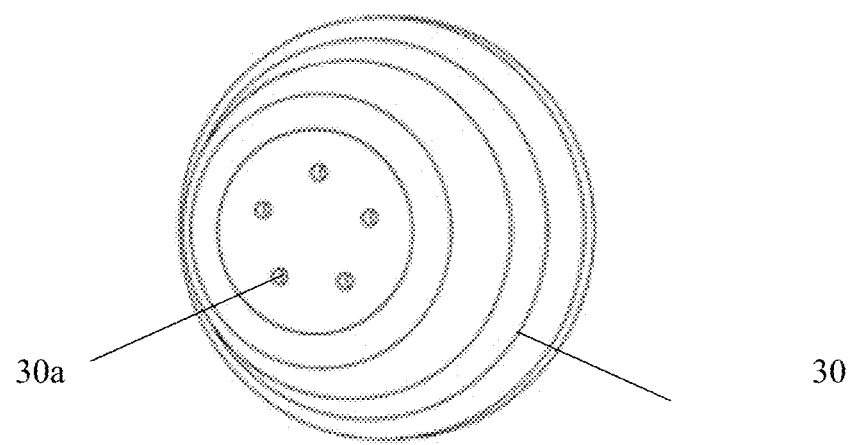
FIG. 4 shows a perspective view of a moveable disk.

In one embodiment, the moveable disk 30 has metered holes 30a as shown in FIG. 4, which allow metered back flow for tuning in reacting to varying levels of chain load. The metered holes 30a may be formed by machine processing, lasers or other manufacturing processes. The metered holes 30a may be vary in size and number and may be between 0.1 mm to 1 mm in diameter.

The moveable disk 30 is moveable between at least a first position and a second position by the check valve spring 32. In the first position, the moveable disk 30 blocks the flow of fluid between the internal reservoir 6 and the high pressure chamber 8 adjacent the internal bulge 4e and a second position in which fluid can flow between the internal reservoir 6 and the high pressure chamber 8 adjacent the internal bulge 4e. The moveable disk 30 is preferably cup-shaped, although other shapes may also be used.

When fluid pressure in the internal reservoir 6 is greater than the force of the check valve spring 32, the pressure of the internal reservoir 6 biases the moveable disk 30 against the check valve spring 32, allowing fluid from the internal reservoir 6 to flow into the high pressure chamber 8. The moveable disk 30 is moved by the check valve spring 32 up to its full stroke when the moveable disk 30 contacts retainer 33. The movement of the moveable disk 30 restricted by the retainer 33.

Fluid from a supply flows from an inlet 5 to the inlet portion 23 of the bore 3a and to the inlet 4d of the hollow piston 4. The fluid fills the internal reservoir 6 of the hollow piston 4. When the fluid in the internal reservoir 6 is of a pressure which is greater than the force the check valve spring 32 exerts on the moveable disk 30, fluid flows adjacent to the internal bulge 4e into the high pressure chamber 8. Backflow from the high pressure chamber 8 to the internal reservoir 6 is prevented by the cup-shape of the moveable disk 30. Fluid from the internal reservoir 6 can enter the high pressure chamber 8 when the pressure in the high pressure chamber 8 falls due to extension of the piston 4 outwards from the housing 3 (increasing the volume of the high pressure chamber 8, drawing fluid into the high pressure chamber 8 from the internal reservoir 6.

When the piston 4 is pushed towards the housing 3 in response to a pulse from the chain or belt, the pressure in the high pressure chamber 8 increases to react to the force applied from the chain or belt. This pressure can be tuned to react to a known force to control the timing drive.

The check valve assembly 20 and piston 4 of an embodiment of the present invention reduces the number of components and uses the piston 4 for multiple functions as well as reduced the package space and costs associated with the piston 4. The controlled orifices 30a in the moveable disk 30 meter flow control back to the internal reservoir 6.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for tensioning an endless loop flexible power transmission member comprising:
   a housing defining a closed end bore having an inlet portion connected to a supply of oil;
   a hollow piston slidably received within the closed end bore, the hollow piston including:
   a body having a first end and a second end;
   an inlet bore between the first end and the second end, the inlet bore having an internal bulge and defining an internal bore including at least a first diameter, a second diameter and a transition diameter between the first diameter and the second diameter, the transition diameter aligned with the internal bulge at the inlet bore;
   a check valve assembly received within the transition diameter including:
   a retainer having a protrusion;
   a moveable disk which seats on the internal bulge;
   a check valve spring with a first end contacting the moveable disk and a second end contacting the retainer and surrounding the protrusion;
   an internal reservoir defined between the first diameter of the internal bore and the check valve assembly;
   a high pressure chamber defined between the second diameter of the internal bore, the closed end of the closed end bore, the check valve assembly and the second end of the body of the hollow piston;
   wherein when fluid pressure in the internal reservoir is greater than the force of the check valve spring, the fluid pressure in the internal reservoir biases the moveable disk against the check valve spring, allowing fluid to flow from the internal reservoir to the high pressure chamber, increasing fluid pressure in the high pressure chamber.

2. The hydraulic tensioner of claim 1, wherein fluid from the inlet portion of the bore of the housing enters the inlet bore of the hollow piston and resupplies the internal reservoir with fluid.

3. The hydraulic tensioner of claim 1, wherein when the hollow piston is pushed towards the closed end of the closed end bore in response to a pulse from the endless loop flexible power transmission member, the fluid pressure in the high pressure chamber increases to react to a force of the pulse from the endless loop flexible power transmission member.

4. The hydraulic tensioner of claim 1, wherein the moveable disk further comprises a plurality of holes.

5. The hydraulic tensioner of claim 1, wherein the retainer is in the high pressure chamber.

6. The hydraulic tensioner of claim 1, wherein the inlet bore is aligned with the inlet portion of the closed end bore.

7. The hydraulic tensioner of claim 1, wherein the transition diameter is less than the first diameter and the second diameter.

8. The hydraulic tensioner of claim 1, wherein the internal bulge is formed by rolling and coining.

9. The hydraulic tensioner of claim 1, wherein the internal bulge is formed by a forming tool.

10. The hydraulic tensioner of claim 1, further comprising a spring in the high pressure chamber with a first end contacting the retainer and a second end contacting the closed end of the closed end bore.

11. The hydraulic tensioner of claim 1, wherein movement of the moveable disk is restricted by the retainer.

12. The hydraulic tensioner of claim 1, wherein the moveable disk is cup shaped and prevents backflow of fluid from the high pressure chamber to the internal reservoir.

13. The hydraulic tensioner of claim 1, wherein the endless loop flexible transmission member is a chain or belt.

* * * * *